US012588669B2

(12) United States Patent
Trentmann

(10) Patent No.: US 12,588,669 B2
(45) Date of Patent: Mar. 31, 2026

(54) METHOD FOR CONTROLLING VALVES OF A SPRAYING BOOM OF AN AGRICULTURAL SPREADING MACHINE

(71) Applicant: Amazonen-Werke H. Dreyer SE & Co. KG, Hasbergen (DE)

(72) Inventor: Markus Trentmann, Wallenhorst (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 92 days.

(21) Appl. No.: 18/273,641

(22) PCT Filed: Jan. 20, 2022

(86) PCT No.: PCT/EP2022/051167
§ 371 (c)(1),
(2) Date: Jul. 21, 2023

(87) PCT Pub. No.: WO2022/157214
PCT Pub. Date: Jul. 28, 2022

(65) Prior Publication Data
US 2024/0074426 A1      Mar. 7, 2024

(30) Foreign Application Priority Data
Jan. 22, 2021      (DE) .......................... 102021101299.6

(51) Int. Cl.
*A01M 7/00*          (2006.01)
(52) U.S. Cl.
CPC ........ *A01M 7/0089* (2013.01); *A01M 7/0042* (2013.01)

(58) Field of Classification Search
CPC . A01M 7/0089; A01M 7/0042; B05B 1/3053; B05B 1/083; B05B 12/085
See application file for complete search history.

(56) References Cited

U.S. PATENT DOCUMENTS

| | | | | |
|---|---|---|---|---|
| 2,490,839 | A | * | 12/1949 | Shaffer .................... B23K 5/22 |
| | | | | 239/722 |
| 5,296,702 | A | | 3/1994 | Beck et al. |
| D346,011 | S | * | 4/1994 | Hawkins ...................... D23/245 |

(Continued)

FOREIGN PATENT DOCUMENTS

| | | |
|---|---|---|
| CN | 109479862 A | 3/2019 |

OTHER PUBLICATIONS

English Translation of Written Opinion for International Application No. PCT/EP2022/051167 dated Apr. 25, 2022.

(Continued)

*Primary Examiner* — Patrick C Williams
(74) *Attorney, Agent, or Firm* — Potomac Law Group, PLLC; John (Jack) Penny

(57)          ABSTRACT
A method for controlling valves of a spraying boom of an agricultural spreading machine, comprising the steps of: generating valve-specific voltage signals for controlling several valves arranged on the spraying boom and providing the valve-specific voltage signals to the a respective valve, wherein the valve-specific voltage signals are pulse width modulated and each have a valve-specific duty cycle, where the valve-specific duty cycles compensate for or reduce influence, which is dependent on the position of the respective valves on the spraying boom, on the valve-specific flow volume of spraying liquid.

14 Claims, 5 Drawing Sheets

(56)  References Cited

U.S. PATENT DOCUMENTS

| 2013/0269578 | A1* | 10/2013 | Grimm | .................... | A01C 7/06 |
| | | | | | 111/127 |
| 2017/0080444 | A1* | 3/2017 | Posselius | .................. | B05B 7/32 |
| 2019/0321844 | A1* | 10/2019 | Schrader | ................. | H01F 7/064 |
| 2020/0101480 | A1 | 4/2020 | Schrader et al. | | |
| 2020/0221682 | A1 | 7/2020 | Grimm et al. | | |

OTHER PUBLICATIONS

English Translation of Chinese Publication No. 109479862 A (Abstract).
English translation of International Search Report for International Application No. PCT/EP2022/051167 dated Apr. 25, 2022.
International Search Report for International Application No. PCT/EP2022/051167 dated Apr. 25, 2022.
Written Opinion for International Application No. PCT/EP2022/051167 dated Apr. 25, 2022.

* cited by examiner

METHOD FOR CONTROLLING VALVES OF A SPRAYING BOOM OF AN AGRICULTURAL SPREADING MACHINE

RELATED APPLICATIONS

The present application claims priority under 35 U.S.C. § 119 to German Application No. 10 2021 101 299.6 filed on Jan. 22, 2021, and under 35 U.S.C. § 365 to International Application No. PCT/EP2022/051167 filed on Jan. 20, 2022. The entire contents of these applications are incorporated herein by reference in their entirety.

The present disclosure relates to a method for controlling valves of a spraying boom of an agricultural spreading machine and a system for controlling valves of a spraying boom of an agricultural spreading machine.

Arranged in the line system of a spraying boom of an agricultural spreading machine, for example, a field sprayer, is a plurality of valves via which the flow volume of spraying liquid to the spray nozzles of the agricultural spreading machine that are arranged on the spraying boom can be controlled. Respective agricultural spreading machines can have a part-width section control or an individual nozzle control so that the valves used to control the flow volume can be switched independently of one another. For this purpose, valve-specific voltage signals are generated and made available to the valves that are arranged on the spraying boom.

In practice it has shown that the position of the respective valves on the spraying boom regularly has an influence on the valve-specific flow volume of spraying liquid. For example, the fluid pressure in the spraying boom drops from the center of the boom in the direction towards the outside so that, with identically controlled valves, different flow volumes arise due to a pressure difference that is based on the position of the respective valves on the spraying boom. The flow volumes differing from one another also arises from a changed pull-in time of the valves, which depends on the fluid pressure applied at the respective valve. The greater the fluid pressure upstream of the valve, the longer the pull-in time. Due to the line lengths of the electrical lines that are connected to the respective valves differing from one another, different voltage drops also arise when the signal is provided so that different voltage levels at the valves result in switching behaviors differing from one another. In this context, a control voltage dropping at the valves results, for example, in an increase in the pull-in time of the valves.

In addition, the valves on a spraying boom are influenced to different extents by pressure waves in the line sections disposed upstream of the valves in dependence of their position on the spraying boom.

The object underlying the disclosure is therefore to reduce position-related influence on the valve-specific flow volumes of valves of a spraying boom.

The object is satisfied by a method of the kind mentioned at the outset, where the valve-specific voltage signals generated are pulse width modulated within the context of the method according to the disclosure and each have a valve-specific duty cycle, where the valve-specific duty cycles compensate for or at least reduce the influence, which is dependent on the position of the respective valves on the spraying boom, on the valve-specific flow volume of spraying liquid.

The disclosure makes use of the knowledge that the position-related influence on the flow volume can be compensated for or at least reduced by valve-specific adjustment of the pulse width modulation. The influence which is dependent on the position of the respective valves on the spraying boom can pertain, for example, to the fluid pressure dropping from the center of the boom in the direction towards the outside, to the signal-specific voltage drop when the valve-specific voltage signals are provided, and/or to pressure waves in the line sections disposed upstream of the valves. Several or all of the voltage signals that are provided to different valves can there have duty cycles that differ from one another, although an identical quantity of spraying liquid is to be dispensed via the valves. The duty cycle of individual or all voltage signals can therefore differ from one another despite an identical nominal flow volume of spraying liquid.

The valves are preferably magnetic valves and have a coil via which a magnetic field can be generated for moving a valve armature. The duty cycle corresponds to the quotient of the pulse duration and the period duration.

The valve-specific voltage signals are generated and/or provided preferably by a control system of the agricultural spreading machine. Voltage conditioning can be carried out in the control system using a voltage converter. A valve-specific voltage value increase could then take place by way of the voltage converter in order to compensate for the voltage drop in the electrical lines to the respective valves.

When generating the valve-specific voltage signals, the fluid pressure applied at the respective valves is taken into account in a preferred embodiment of the method according to the disclosure for the compensation for the pressure-dependent influence on the valve-specific flow volume of spraying liquid. The valve-specific duty cycles are therefore pressure-dependent. When generating the valve-specific voltage signals, the control system can use, for example, a correction function or correction table that describes the relationship between the fluid pressure applied at the respective valves and a suitable adjustment of the duty cycle. The pressure-dependent influence on the valve-specific flow volume of spraying liquid can be attributed to, for example, the fluid pressure applied to the respective valves decreasing from the center of the boom in the direction towards the outside. The fluid pressure affects, for example, the flow rate of the spraying liquid through the valves that are in an open state. Due to the different flow rates, a larger quantity of spraying liquid flows through a valve arranged at the center of the boom than through a valve arranged at the outside of the spraying boom, even if both valves have an identical opening time. This influence can be compensated for or at least reduced by voltage signals having a valve-specific duty cycle. The fluid pressure applied to the valves can also influence the switching behavior of the valves so that valves arranged at the center of the boom open more slowly than valves arranged on the outside region of the spraying boom due to the higher fluid pressure. This influence can also be compensated for or reduced by providing voltage signals having valve-specific duty cycles. The drop in fluid pressure at a valve results in faster opening behavior so that the valve stays open longer. Furthermore, a fluid pressure dropping upstream of the nozzle also leads to a decreasing volume flow. This pressure-related influence can be compensated for with valve-specific duty cycles.

In another embodiment of the method according to the disclosure, the fluid pressures applied are determined at the respective valves. The control system can use the fluid pressures applied at the respective valves to determine, in particular to calculate, the pressure-dependent influence on the valve-specific flow volume of spraying liquid. For this purpose, the control system can use, for example, a correction function or a correction table which describes the relationship between pressure, volumetric flow, and the opening and closing times of the valves. On the basis of these determinations, valve-specific voltage signals with valve-specific duty cycles can then be generated and provided, by way of which the pressure-dependent influence on the valve-specific flow volume of spraying liquid is compensated for or at least reduced. Determining the fluid pressures applied at the respective valves is preferably done by way of one or more pressure measurements in the spraying boom. Consequently, one or more pressure measuring devices can be arranged at the spraying boom. Alternatively or additionally, the fluid pressures applied at the respective valves can be determined by the control system by modeling the pressure behavior in the spraying boom using the volume flow. The volume flow is either measured using one or more flow measuring devices or calculated on the basis of the existing machine settings. The pressure conditions in the spraying boom can also be modeled using the line geometry of the spraying boom.

In another preferred embodiment of the method according to the disclosure, determining the fluid pressures applied at the respective valves is done using at least one pressure measurement and a pressure calculation based on the pressure measurement and taking into account the pressure change in the spraying boom. A pressure drop model can be used for the pressure calculation. For example, the pressure drop model can also take into account the line geometry of the spraying boom. The fluid pressure is measured, for example, at a central point in the spraying boom and the pressure drop is calculated using the line cross-section and/or the liquid discharge along the boom. In this way, a valve-specific fluid pressure for a plurality of valves of the spraying boom can be determined on the basis of a pressure measurement. The influence of the fluid pressure differences at the valves is compensated for or at least reduced by the valve-specific duty cycle.

When generating the valve-specific voltage signals, the signal-specific voltage drop caused by the provision of the valve-specific voltage signals is taken into account in another advantageous development of the method according to the disclosure for the compensation for the voltage-dependent influence on the valve-specific flow volume of spraying liquid. The valve-specific duty cycles are therefore dependent on the voltage drop. When generating the valve-specific voltage signals, the control system can use, for example, a correction function or a correction table that describes the relationship between the voltage drop and a suitable adjustment of the duty cycle. The voltages applied at the respective valves decrease during active energization from the center of the boom in the direction towards the outside. The voltages decreasing from the center of the boom in the direction towards the outside results, for example, from different line lengths of the electrical lines used to provide the signal. The different line lengths of the electrical lines leads to different electrical resistances. The voltage signals for valves which are arranged at the outward side on the spraying boom are typically provided via longer electrical lines than voltage signals that are provided for valves which are arranged at the center of the spraying boom. Due to the different electrical resistances of the electrical lines, different voltage levels therefore arise at the valves of the spraying boom. The signal-specific voltage drop or the different voltage levels at the valves can, for example, be calculated, for example, based on a voltage drop model. Alternatively or additionally, the signal-specific voltage drop or the different voltage levels can be measured at the valves, for example, by voltage sampling. The voltages applied to the respective valves during active energization influence the switching behavior of the valves. Valves in which the PWM pulses have a comparatively high voltage level switch faster than valves in which the PWM pulses have a lower voltage level because the valve armature moves faster. The faster pull-in time increases the time that the valve is open, allowing for more fluid to flow through the valve and be dispensed. With a slow armature motion due to a lower voltage, the pull-in time is longer and the time that the valve is open is therefore shorter. The switch-on and switch-off times of the valves therefore vary from one another due to the drop in the voltage level of the PWM pulses as the line length of the electrical lines increases. This effect can be compensated for or at least reduced by valve-specific duty cycles. If the voltage varies at the valves, the valve-specific duty cycles ensure that the valves switch on and off at the same speed despite the voltage variation. For example, an average switch-on time of all valves can be used for this purpose. The average switch-on time can be determined cyclically.

In another preferred embodiment of the method according to the disclosure, the signal-specific voltage drops caused by the provision of the valve-specific voltage signals are determined by one or more voltage measurements. The voltages applied at the respective valves during active energization can be measured, for example, directly at a control unit of the control system. The valve-specific duty cycle is adjusted in dependence of the voltage applied to the respective valves during active energization.

A method according to the disclosure is furthermore preferred in which the valve-specific voltage signals generated compensate for or at least reduce the influence of pressure waves in the line sections of the spraying boom connected to the respective valves on the valve-specific flow volume of spraying liquid. The pressure waves can be overpressure regions or underpressure regions which move through the fluid line at a propagation speed and therefore pass through different line sections. The valve-specific voltage signals are therefore dependent on the pressure wave. Pressure waves in the fluid lines of the spraying boom arise due to the pulse width modulation. The pressure waves in the fluid lines of the spraying boom influence the valve-specific flow volume during the opening phase of the respective valves. This effect is intensified by the fact that pressure waves are superimposed in the boom, so that incorrect application is increased even more. These pressure waves can be avoided or at least reduced by controlling the valves in a manner temporally matched to each other. For this purpose, the valves are matched to each other or controlled offset from one another in such a way that the pressure waves are not superimposed and/or existing pressure waves are eliminated or at least weakened by newly generated pressure waves.

In addition, a method according to the disclosure is preferred in which the propagation of pressure waves, in particular the propagation speed of pressure waves, in the spraying boom is taken into account when generating the valve-specific voltage signals in order to avoid or reduce the pressure wave superimposition. The superimposition of pressure waves in the lines of the spraying boom can occur by way of the flow rate and the frequency of the pulse width modulation. Pressure waves in the fluid lines arise, for example, when opening and closing a valve. Pressure wave superimposition arises when the duration of flow of the spraying liquid between valves connected in series, i.e. arranged one behind the other, corresponds to the length of time between the opening processes of the valves connected in series. In order to avoid or reduce pressure wave super-imposition, valves arranged next to one another and connected in series must therefore be switched in a that is matched to one another or offset relative to one another such that the propagation of pressure waves does not lead to pressure wave superimposition. This prevents overpressure regions or underpressure regions from adding up.

In an alternative embodiment of the method according to the disclosure, the flow rate of the spraying liquid in the spraying boom and the line length of the fluid line between successive valves arranged in series are taken into account when generating the valve-specific voltage signals to avoid or reduce pressure waves superimposition. The valve-specific voltage signals are therefore dependent on the flow rate of the spraying liquid in the spraying boom. For example, switch-on times and switch-off times of adjacent valves can then overlap. The line length of the fluid line between successive valves arranged in series is preferably also taken into account for the signal generation for pressure wave compensation. For example, a pressure wave trough moving in the direction of a valve can be used to compensate in part or entirely for a pressure wave generated by the subsequent valve.

In a further development of the method according to the disclosure, pressure pulses are introduced into the lines of the spraying boom using a pressure accumulator to compensate for or reduce pressure waves in the spraying boom. In order to apply pressure pulses in a selective manner, the pressure waves and their propagation in the lines of the spraying boom must be known. If the pressure waves introduced by the valve switching into the lines of the spraying boom are known, suitable counter-impulses can be generated using the pressure accumulator so that pulse compensated for takes place in part or entirely within the lines of the spraying boom.

The object underlying the disclosure is also satisfied by a system of the kind mentioned at the outset, where the system according to the disclosure has a control system which is configured to generate pulse width modulated voltage signals each having a valve-specific duty cycle so that the influence, which is dependent on the position of the respective valves on the spraying boom, on the valve-specific flow volume of spraying liquid is compensated for or at least reduced. The system according to the disclosure is preferably configured to control valves of a spraying boom of an agricultural spreading machine according to the method of one of the embodiments described above. With regard to the advantages and modifications of the system according to the disclosure, reference is first made to the advantages and modifications of the method according to the disclosure.

When generating the valve-specific voltage signals, the control system in a preferred embodiment of the system according to the disclosure is configured to take into account the fluid pressures applied at the respective valves for the compensation for the pressure-dependent influence on the valve-specific flow volume of spraying liquid. When generating the valve-specific voltage signals, the control system is alternatively or additionally configured to take into account the signal-specific voltage drop caused by the provision of the valve-specific voltage signals for the compensation for the voltage-dependent influence on the valve-specific flow volume of spraying liquid.

A system according to the disclosure is furthermore advantageous in which in which the control system is configured, when generating the valve-specific voltage signals, to take into account the pressure waves arising in the line sections of the spraying boom connected to the respective valves for the compensation for the pressure-wave-dependent influence on the valve-specific flow volume of spraying liquid.

Preferred embodiments of the disclosure shall be explained and described in more detail below with reference to the accompanying drawings, where:

Figure 1:
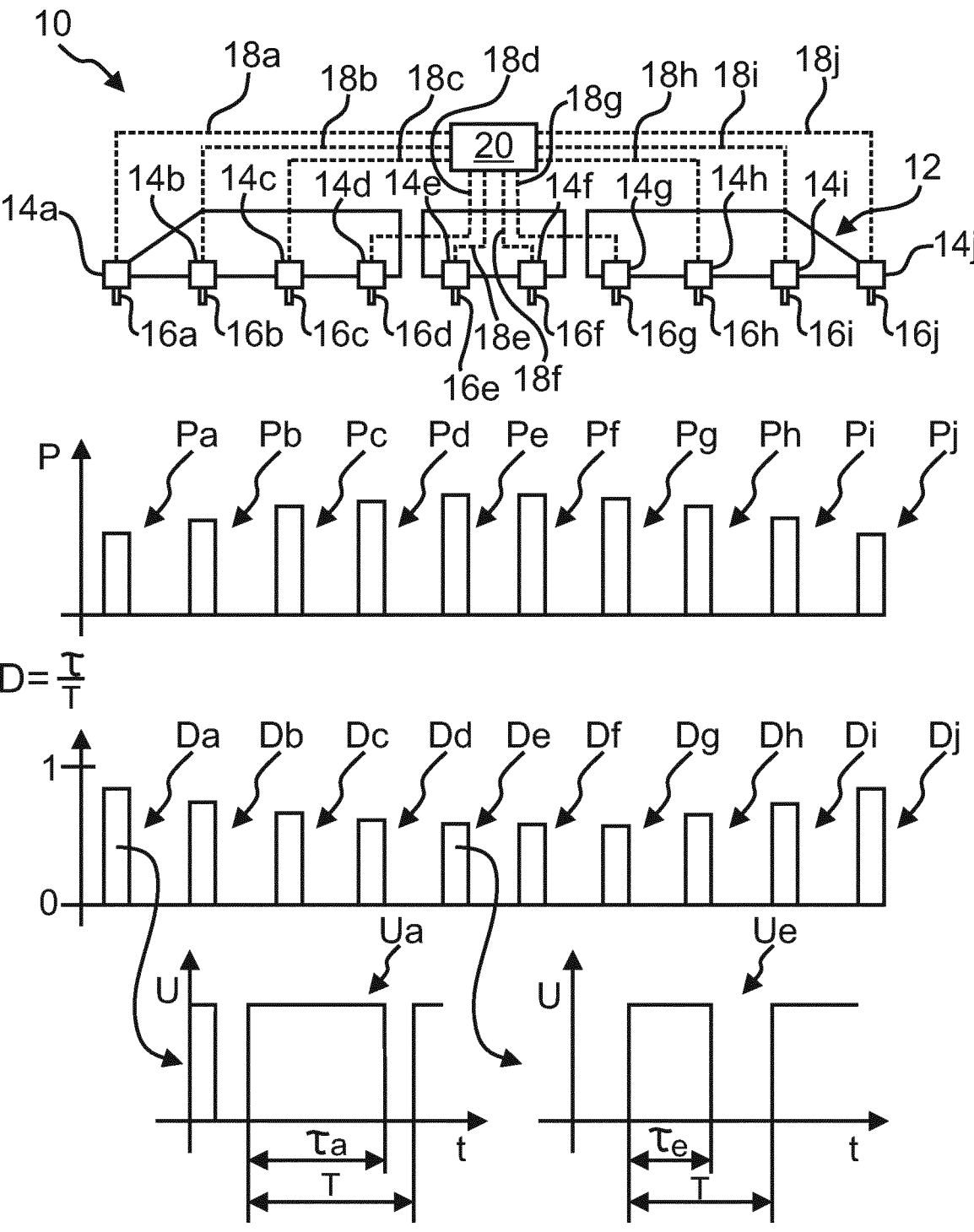
FIG. 1 shows a system according to the disclosure together with the fluid pressures applied at the valves and the resulting valve-specific duty cycles of the voltage signals generated.

FIG. 1 shows a system 10 for controlling valves 14a-14j of a spraying boom 12 of an agricultural spreading machine. The agricultural spreading machine can be, for example, a field sprayer. A spreading nozzle 16a-16j each is arranged on valves 14a-14j, where valves 14a-14j and spreading nozzles 16a-16j each form a valve-nozzle unit.

System 10 furthermore comprises a control system 20 which is connected via electrical lines 18a-18j to valves 14a-14j for signal transmission. Control system 20 generates valve-specific voltage signals $U_a$, $U_e$ for controlling valves 14a-14j, where valve-specific voltage signals $U_a$, $U_e$ are provided via lines 18a-18j to valves 14a-14j. Valve-specific voltage signals $U_a$, $U_e$ illustrated are provided to valves 14a, 14e, where valve-specific voltage signals provided to other valves 14b-14d, 14f-14j are not illustrated.

Valve-specific voltage signals $U_a$, $U_e$ generated by control system 20 are pulse width modulated and each have a valve-specific duty cycle $D_a$-$D_j$. Valve-specific duty cycles $D_a$-$D_j$ compensate for or reduce the influence, which is dependent on the position of respective valves 14a-14j on spraying boom 12, on the valve-specific flow volume of spraying liquid.

The bar graph shown below spraying boom 12 shows fluid pressure $P_a$-$P_j$ applied to respective valves 14a-14j. It can be seen in the bar graph that fluid pressure $P_a$-$P_j$ applied to respective valves 14a-14j decreases from the center of the boom in the direction towards the outside. Since fluid pressure P influences the flow rate of the spraying liquid through valves 14a-14j, the pressure-dependent influence on the valve-specific flow volume of spraying liquid must be taken into account when controlling valves 14a-14j.

The pressure-dependent influence on the valve-specific flow volume of spraying liquid is compensated for or at least reduced in that valve-specific voltage signals $U_a$, $U_e$ generated by control system 20 have a valve-specific duty cycle $D_a$-$D_j$.

The bar graph relating to duty cycle D shows that duty cycle $D_a$ of voltage signal $U_a$ generated for valve 14a is greater than duty cycle $D_e$ of voltage signal $U_e$ generated for valve 14e. Fluid pressure P dropping from the center of the boom in the direction towards the outside is thus compensated for in that the valves disposed outwardly remain open longer by way of a valve-specific duty cycle than the valves arranged at the center of the boom.

Duty cycle D corresponds to the quotient of pulse duration $\tau$ and period duration T. Period duration T is the same for all voltage signals $U_a$, $U_e$ generated by control system 20. Duty cycles $D_a$, $D_e$, which differ from one another, result from different pulse durations $\tau_a$, $\tau_e$.

In order to implement the valve control, it is necessary for control system 20 to know fluid pressures $P_a$-$P_j$ applied at respective valves 14a-14j. As part of the control method, fluid pressures $P_a$-$P_j$ applied at respective valves 14a-14j are determined, for example, by way of a pressure measurement and a pressure calculation based on the pressure measurement and taking into account the pressure change in spraying boom 12. As part of the calculation, control system 20 can use, for example, a pressure drop model so that actual fluid pressure P only has to be measured at a central point in spraying boom 12 and the pressure drop is then calculated using the line cross-section and/or the liquid output along spraying boom 12. In this way it is possible to compensate for or at least reduce the influence of the fluid pressure differences at valves 14a-14j by way of valve-specific duty cycles $D_a$-$D_j$.

Figure 2:
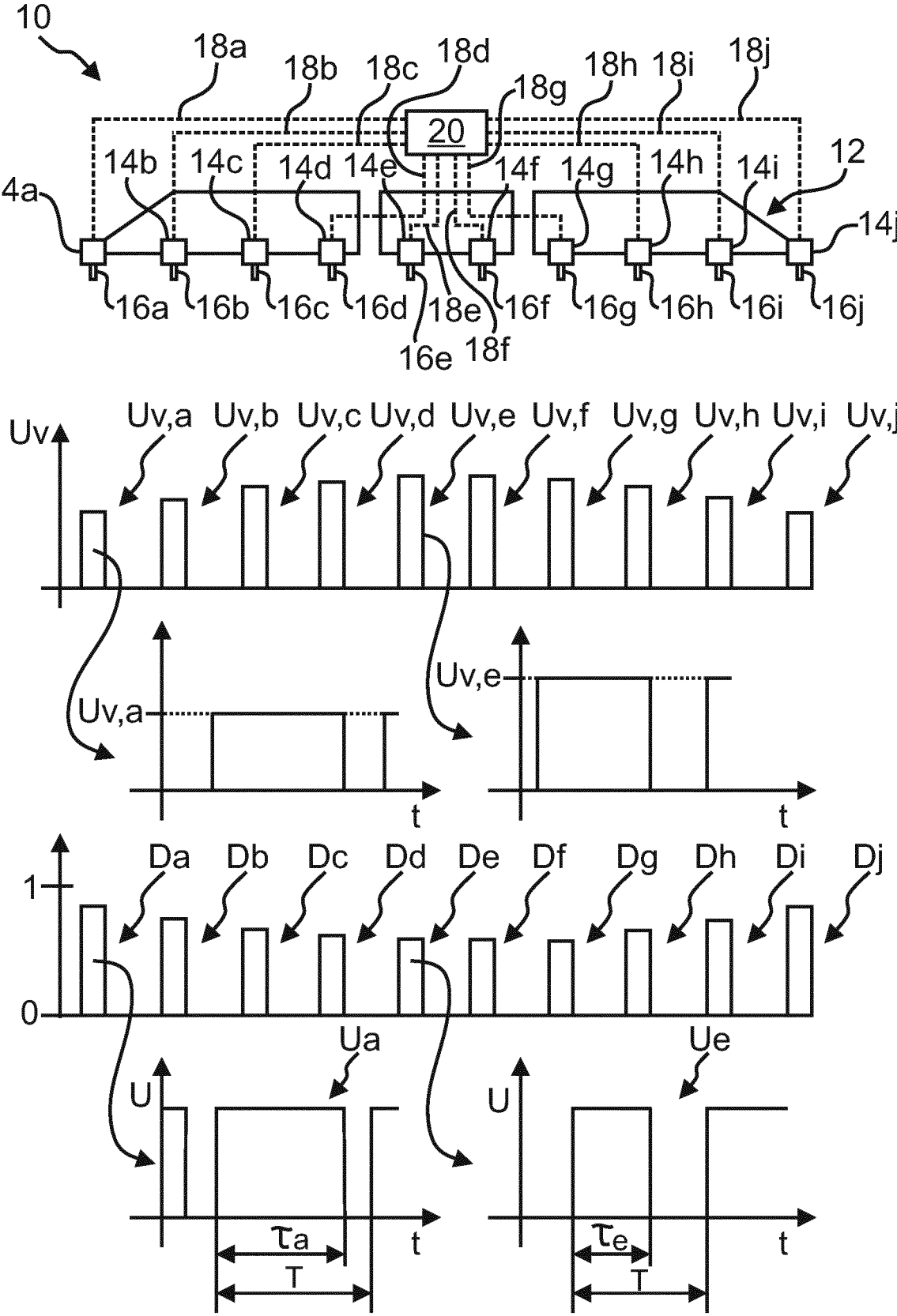
FIG. 2 shows a system according to the disclosure together with the level of the supply voltages applied to the valves and the resulting valve-specific duty cycles of the voltage signals generated.

FIG. 2 likewise shows a system 10 for controlling valves 14a-14j of a spraying boom 12. Control system 20 generates valve-specific voltage signals $U_a$, $U_e$ for controlling valves 14a-14j. Electrical lines 18a-18j, via which control system 20 is connected to valves 14a-14j, have differing line lengths so that different signal-specific voltage drops arise due to differing electrical resistances when voltage signals $U_a$, $U_e$ are provided.

The bar chart shown under system 10 shows that supply voltage level $U_V$, i.e. the voltage level of the PWM pulses arriving at valves 14a-14j, decreases from the center of the boom in the direction towards the outside due to the different lengths of electrical lines 18a-18j. Voltages $U_{V,a}$-$U_{V,j}$ applied at respective valves 14a-14j decrease from the center of the boom in the direction towards the outside during active energization. Voltages $U_{V,a}$-$U_{V,j}$ applied to respective valves 14a-14j during active energization influence the switching behavior of valves 14a-14j. Due to dropping voltages $U_{V,a}$-$U_{V,j}$, the switch-on and switch-off times of valves 14a-14j vary from one another, so that this needs to be compensated for with valve-specific duty cycles $D_a$-$D_j$. To compensate for or at least reduce the voltage-dependent influence on the valve-specific flow volume of spraying liquid, control system 20 generates valve-specific voltage signals $U_a$, $U_e$ which take into account the signal-specific voltage drop when the signal is provided. Voltage signal $U_a$, which is provided to outwardly disposed valve 14a, therefore has a larger duty cycle $D_a$ than voltage signal $U_e$, which is provided to valve 14e.

In order for control system 20 to be able to take into account the signal-specific voltage drop for the compensation for the voltage-dependent influence on the valve-specific flow volume of spraying liquid, the signal-specific voltage drop must be known to control system 20. As part of the control method, the signal-specific voltage drops caused by the provision of valve-specific voltage signals $U_a$, $U_e$ are therefore determined by one or more voltage measurements. Valve-specific duty cycle $D_a$-$D_j$ is adjusted in dependence of voltages $U_{V,a}$-$U_{V,j}$ applied to respective valves 14a-14j during active energization.

Figure 3:
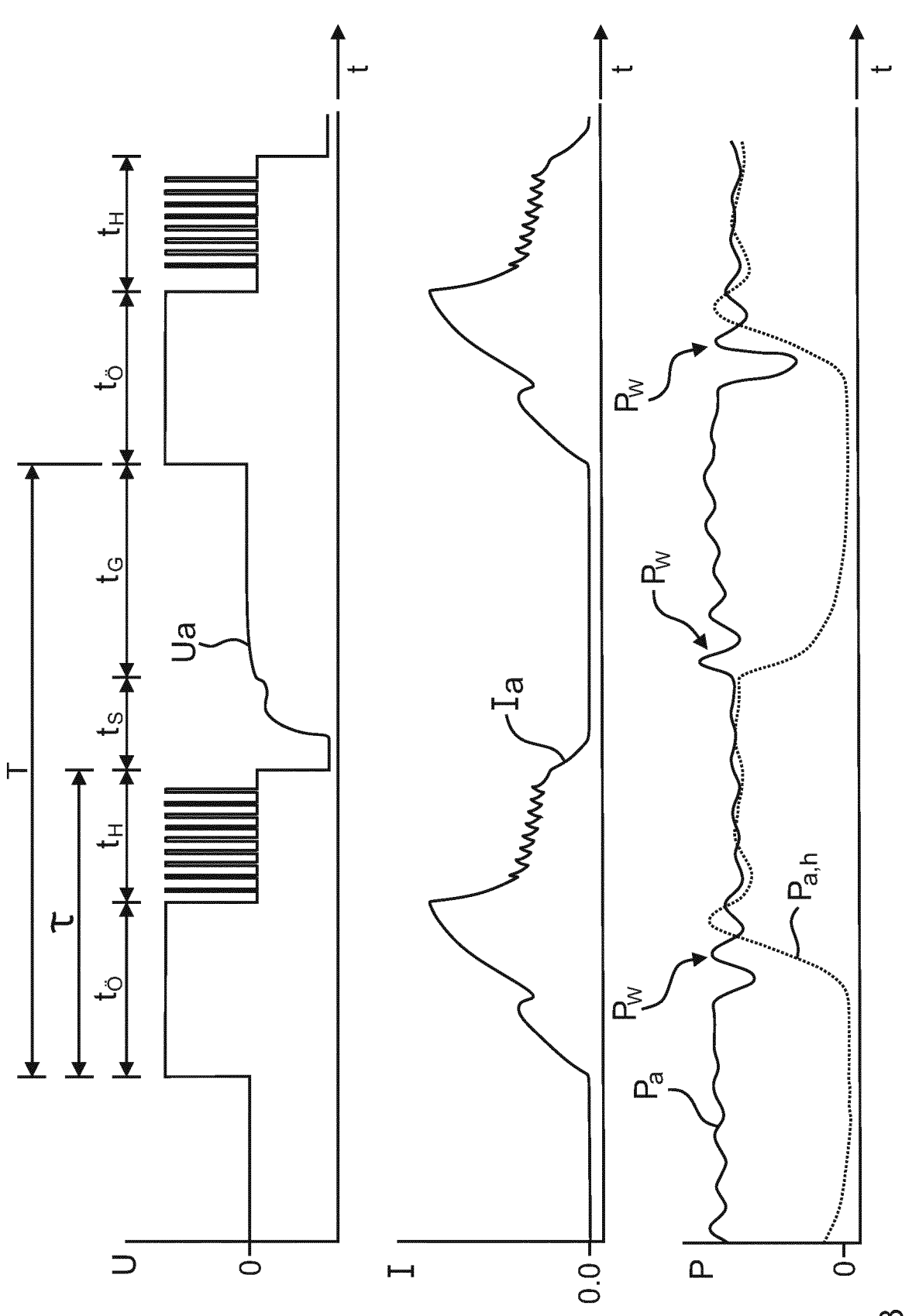
FIG. 3 shows the development over time of the voltage applied at a valve and of the current flowing through the valve, as well as the pressure profiles over time showing pressure waves upstream and downstream of the valve.

FIG. 3 shows the profile of a voltage $U_a$ over time applied to a valve 14a, the profile of a current $I_a$ over time flowing through a valve 14a, and pressure profiles $P_a$, $P_{a,h}$ upstream and downstream of valve 14a over time. Voltage U, amperage I, and pressure P are plotted against time t in the diagrams. Valve 14a, not shown, is a magnetic valve.

It arises from voltage profile $U_a$ over time that the voltage signal is pulse width modulated. During an opening phase to, a voltage pulse causes a current to be injected into valve 14a, where a valve armature is moved from a closed position to an open position by the current injected during opening phase $t_O$. After the valve armature has reached the open position, a current, which is sufficient to hold the valve armature in the open position, is injected during a holding phase $t_H$. To close valve 14a, there is a first brief voltage inversion and then an interruption of the voltage supply during a closing phase $t_S$. During closed phase $t_G$, the voltage signal is at zero level, so that no current is injected into valve 14a. To open valve 14a again, closed phase $t_G$ is again followed by opening phase to and holding phase $t_H$ The pressure profile diagram shows that fluid pressure $P_a$ applied to valve 14a is constantly at a high level and has a plurality of pressure waves $P_W$. Fluid pressure $P_{a,h}$ downstream of valve 14a increases during opening phase to and drops again in closing phase $t_S$.

Pressure waves $P_W$ in the lines of spraying boom 12 therefore arise due to the pulse width modulation. Pressure waves $P_W$ influence the valve-specific flow volume during opening phase to and holding phase $t_H$. This effect is intensified by the fact that pressure waves $P_W$ can superimpose in spraying boom 12, so that the incorrect application is increased even more.

Figure 4:
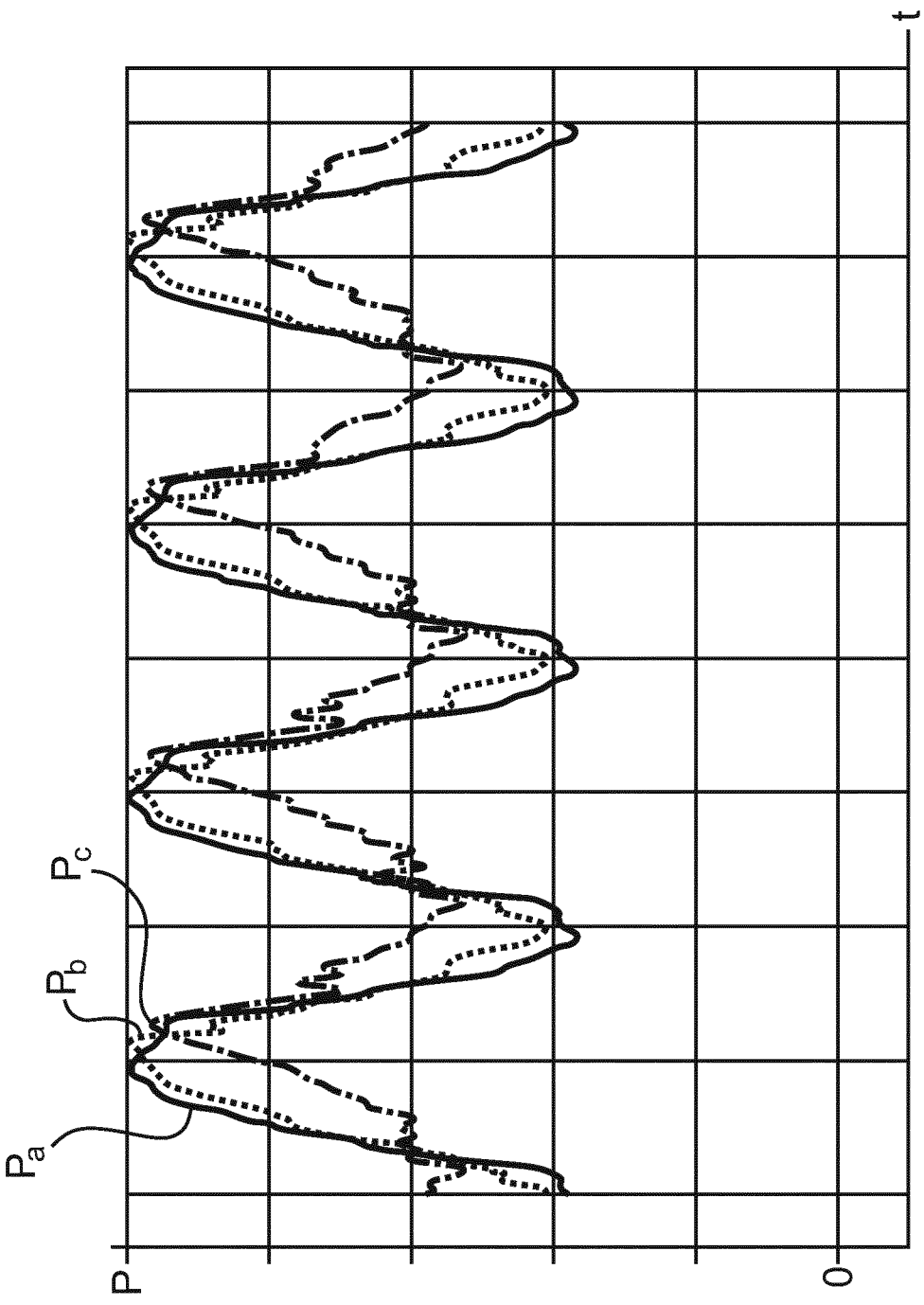
FIG. 4 shows pressure profiles over time at three different valves without pressure wave compensation.

FIG. 4 shows three wave-like pressure profiles $P_a$-$P_c$ at three valves 14a-14c over time t when no pressure wave compensation is performed.

As part of the method, the valve-specific voltage signals generated are generated by control system 20, while taking into account the influence of pressure waves $P_W$ in the line sections of spraying boom 12 connected to respective valves 14a-14j on the valve-specific flow volume, so that valves 14a-14j are controlled in a manner coordinated with or offset from one another, whereby pressure waves $P_W$ are not superimposed and existing pressure waves $P_W$ are eliminated or at least weakened by newly generated pressure waves $P_W$.

Figure 5:
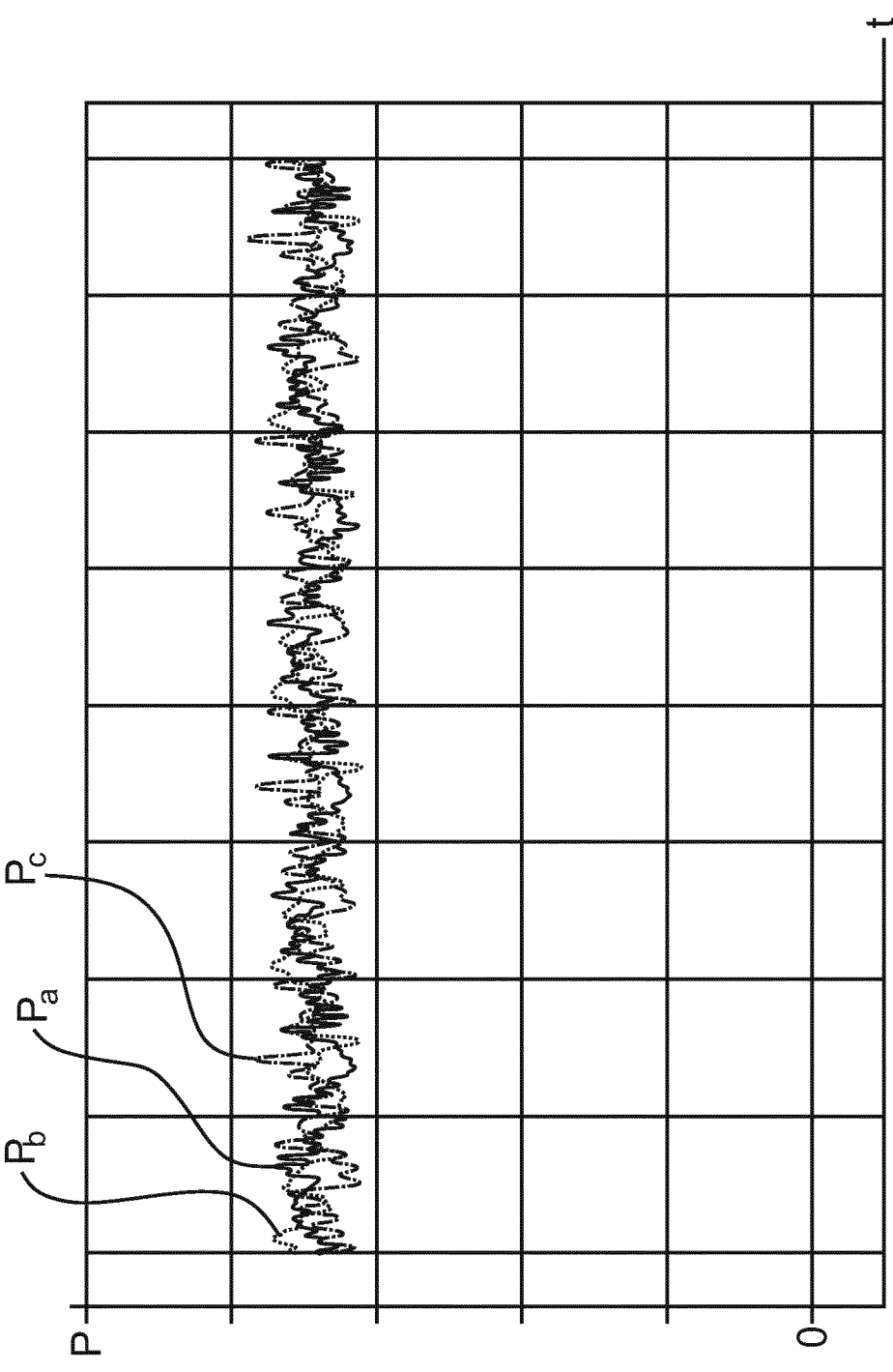
FIG. 5 shows pressure profiles over time at the valves underlying FIG. 4 with pressure wave compensation.

The effect of this pressure wave compensation is shown in FIG. 5. The deflection or the amplitude of the pressure waves within the spraying boom is significantly reduced by the pressure wave compensation. The pressure wave propagation, namely the propagation speed of pressure waves $P_W$ in spraying boom 12, is taken into account when generating valve-specific voltage signals $U_a$, $U_e$, in order to avoid or reduce pressure waves superimposition. Superposition of pressure waves $P_W$ can be avoided or at least reduced by suitable control of valves 14a-14j by way of the flow rate of the spraying liquid in spraying boom 12 and the PWM frequency. When generating valve-specific voltage signals $U_a$, $U_e$ to avoid or reduce superimposed pressure waves, the control system, when generating valve-specific voltage signals $U_a$, $U_e$, takes into account the flow rate of the spraying liquid in spraying boom 12 and the line length of the fluid line between successive valves 14a-14j arranged in series

LIST OF REFERENCE CHARACTERS

10 system
12 spraying boom
14a-14j valves
16a-16j spreading nozzles
18a-18j lines
20 control system
D, $D_a$-$D_j$ duty cycles
I amperage
$I_a$ amperage $P_W$ pressure waves
P fluid pressure
$P_a$-$P_j$ fluid pressures
$P_{a,h}$ fluid pressure
t time
$t_O$ opening phase
$t_H$ holding phase
$t_S$ closing phase
$t_G$ closed phase
$\tau$, $\tau_a$, $\tau_e$ pulse durations
T period duration
U voltage
$U_a$, $U_e$ voltage signals
$U_V$ supply voltage level
$U_{V,a}$-$U_{V,j}$ supply voltage levels

The invention claimed is:

1. A method for controlling valves of a spraying boom of an agricultural spreading machine, comprising:
generating valve-specific voltage signals for controlling several valves arranged on said spraying boom; and
providing said valve-specific voltage signals to a respective valve of said valves, wherein said valve-specific voltage signals generated are pulse width modulated and each have a valve-specific duty cycle, wherein the duty cycle corresponds to the quotient of the pulse duration and the period duration, where said valve-specific duty cycles compensate for or reduce influence, which is dependent on a position of said respective valves on said spraying boom, on a valve-specific flow volume of spraying liquid, wherein the duty cycles of individual or all voltage signals differ from one another despite an identical nominal valve-specific flow volume of spraying liquid.

2. The method according to claim 1, wherein when generating said valve-specific voltage signals, fluid pressure applied at said respective valves is taken into account for compensation for pressure-dependent influence on the valve-specific flow volume of spraying liquid.

3. The method according to claim 2, further comprising- determining fluid pressures applied at said respective valves, by way of one or more pressure measurements in said spraying boom.

4. The method according to claim 3, wherein determining said fluid pressures applied at said respective valves is done by at least one pressure measurement and a pressure calculation based on said pressure measurement and taking into account a pressure change in said spraying boom.

5. The method according to claim 1, wherein when generating said valve-specific voltage signals, a signal-specific voltage drop caused by the provision of said valve-specific voltage signals is taken into account for compensation for voltage-dependent influence on the valve-specific flow volume of spraying liquid.

6. The method according to claim 5, further comprising:
determining the signal-specific voltage drops caused by the provision of said valve-specific voltage signals by one or more voltage measurements.

7. The method according to claim 1, wherein said valve-specific voltage signals generated compensate for or reduce the influence of pressure waves in line sections of said spraying boom connected to said respective valves on the valve-specific flow volume of spraying liquid.

8. The method according to claim 7, wherein said generating step a pressure wave propagation is taken into account when generating said valve-specific voltage signals in order to avoid or reduce pressure wave superimposition.

9. The method according to claim 8, wherein a flow rate of the spraying liquid in said spraying boom and ta line length of said fluid line between successive valves arranged in series are taken into account when generating said valve-specific voltage signals to avoid or reduce pressure wave superimposition.

10. The method of claim 8, wherein the pressure wave propagation is a propagation speed of pressure waves Pw in spraying boom.

11. The method according to claim 7, further comprising:
introducing pressure pulses into the lines of said spraying boom using a pressure accumulator to compensate for or reduce pressure waves in said spraying boom.

12. A system for controlling valves of a spraying boom of an agricultural spreading machine, comprising:
a plurality of valves arranged on a spraying boom; and
a control system configured to generate valve-specific voltage signals for controlling said valves and for providing said valve-specific voltage signals to said plurality of valves, wherein
said control system is configured to generate voltage signals which are pulse width modulated, each of said voltage signals having a valve-specific duty cycle so that influence, which is dependent on the position of said respective valves on said spraying boom, on valve-specific flow volume of spraying liquid is compensated for or reduced, wherein the duty cycle corresponds to the quotient of the pulse duration and the period duration and wherein the duty cycles of individual or all voltage signals differ from one another despite an identical nominal valve-specific flow volume of spraying liquid.

13. The system according to claim 12, wherein said control system is configured, when generating said valve-specific voltage signals, to take into account at least one of:
fluid pressure applied at said respective valves for the compensation for the pressure-dependent influence on the valve-specific flow volume of spraying liquid, and
signal-specific voltage drop caused by providing said valve-specific voltage signals for the compensation for the voltage-dependent influence on the valve-specific flow volume of spraying liquid.

14. The system according to claim 12, wherein said control system is configured, when generating said valve-specific voltage signals, to take into account said pressure waves arising in line sections of said spraying boom connected to said respective valves for compensation of pressure-wave-dependent influence on the valve-specific flow volume of spraying liquid.

* * * * *